(12) United States Patent
McCall

(10) Patent No.: US 7,900,433 B2
(45) Date of Patent: Mar. 8, 2011

(54) FAN EXHAUST NOZZLE FOR TURBOFAN ENGINE

(75) Inventor: John McCall, Andover, CT (US)

(73) Assignee: United Technologies Corporation, Hartford, CT (US)

( * ) Notice: Subject to any disclaimer, the term of this patent is extended or adjusted under 35 U.S.C. 154(b) by 1343 days.

(21) Appl. No.: 11/513,707

(22) Filed: Aug. 31, 2006

(65) Prior Publication Data
US 2008/0053061 A1 Mar. 6, 2008

(51) Int. Cl.
*F02K 1/00* (2006.01)
*F02C 3/00* (2006.01)

(52) U.S. Cl. ............... 60/226.1; 60/770; 239/265.19

(58) Field of Classification Search .............. 60/226.1, 60/262, 770, 796, 797; 239/265.19
See application file for complete search history.

(56) References Cited

U.S. PATENT DOCUMENTS

| | | | | |
|---|---|---|---|---|
| 3,393,518 | A * | 7/1968 | Bridge | 60/770 |
| 3,721,389 | A * | 3/1973 | MacKinnon et al. | 60/226.1 |
| 3,806,067 | A * | 4/1974 | Kutney | 60/226.1 |
| 4,280,587 | A * | 7/1981 | Bhat | 60/262 |
| 4,449,683 | A * | 5/1984 | Gratzer et al. | 244/130 |
| 5,860,276 | A * | 1/1999 | Newton | 60/226.1 |
| 7,165,744 | B2 | 1/2007 | Howarth et al. | 244/55 |

* cited by examiner

*Primary Examiner* — Ted Kim
(74) *Attorney, Agent, or Firm* — Carlson, Gaskey & Olds PC

(57) ABSTRACT

The cross sectional flow area of a fan discharge nozzle on one side of a central plane of an associated gas turbine engine power plant is greater than the corresponding flow area of the fan discharge nozzle on an opposite side of the central plane to compensate for the blockage of fan airflow by a pylon.

8 Claims, 2 Drawing Sheets

FAN EXHAUST NOZZLE FOR TURBOFAN ENGINE

BACKGROUND OF THE INVENTION

1. Technical Field

This invention relates generally to aircraft gas turbine engines and particularly to turbofan gas turbine engines.

2. Background Art

The operation of turbofan gas turbine aircraft engines is well known. Such engines include a serial arrangement of a fan, a compressor, a combustor and a turbine (the compressor, combustor and turbine comprising a "core engine"). Air admitted into the inlet of the engine is compressed by the engine's compressor. The compressed air is then mixed with fuel in the engine's combustor and burned. The high-energy products of combustion of the burned airfuel mixture then enters the turbine with extracts energy from the mixture in order to drive the compressor and fan. That energy extracted by the turbine above and beyond that necessary to drive the compressor and fan, exits the engine at the core engine exhaust nozzle thereof, producing thrust which powers an associated aircraft. A much larger amount of thrust is produced by the fan which takes in ambient air and accelerates and discharges such air through a fan exhaust nozzle. The ratio of the volumetric flow of air accelerated by the fan to that of the products of combustion discharged from the core exhaust nozzle can be as high as 5-10:1 or even higher.

As aircraft gas turbine engines evolve, they have been required to produce greater and greater quantities of thrust for powering large commercial transport aircraft of ever-increasing capacity, as well as to operate on as little fuel as possible to accommodate the ever-increasing range requirements of such commercial transport aircraft. Recent dramatic escalation in the cost of jet fuel has made the requirements of minimizing the fuel consumption of modern commercial gas turbine aircraft engines even more important.

For efficient operation of such aircraft gas turbine engines, that is, to minimize the amount of fuel required to generate a given amount of thrust, it is necessary that the flow output of both the turbine and fan be precisely controlled as to both speed and direction. Controlling the speed of such flows is achieved in general by controlling the cross sectional flow areas of the core engine and fan exhaust nozzles respectively, by either optimally sizing fixed area nozzles for nominal engine operating conditions or employing variable area exhaust nozzles which can be adjusted in area for optimal flow throughout a range of operating conditions. The geometric shape of the exhaust nozzles themselves controls the direction of flow therethrough.

Both the fan and core engine exhaust nozzles are functionally defined by components of the engine's nacelle. The nacelle includes a core cowl which provides an aerodynamically efficient cover for the core engine extending threrearound and terminating at the downstream end thereof at the engine's exhaust nozzle. The nacelle also includes an outer fan cowl which surrounds the core cowl, enclosing the blades of the fan and defining with the core cowl, an annular fan duct which terminates at the fan exhaust nozzle. Heretofore, the core cowl and fan cowl have been concentric to one another, that is, both such components have shared a common longitudinal center axis such that the fan duct, from the fan inlet to the fan exhaust nozzle is, for the most part, perfectly annular.

The engine and nacelle are typically attached to the underside of the wing of commercial transport airplanes by a pylon which includes a support beam extending generally from a structural member of the aircraft's wing through the nacelle fan cowl and core cowl to the engine's case. Typically this beam is covered by a fairing to aerodynamically smooth the flow around the beam. Thus, it will be appreciated that the pylon must necessarily extend through the fan duct between the fan cowl and core engine cowl. The fairing over the mounting beam somewhat reduces the disturbance to the air flow through the fan duct caused by the pylon, and it has always been felt that the deleterious effect of the pylon's presence in the fan duct was limited to the resistance to the flow through the annular fan duct caused by the pylon.

DISCLOSURE OF THE INVENTION

The present invention is predicated upon the discovery that not only does the obstruction posed by the pylon in the fan duct necessarily restrict fan duct flow thereby reducing the flow rate through the fan duct, but also causes a shift in the direction of the thrust associated with the flow through the fan duct, away from the pylon. That is, applicants have determined that the obstruction to flow through the fan duct posed by the pylon in that portion of the duct occupied by the pylon, causes a diametrically opposite portion of the fan duct to receive greater flow therethrough. This imbalance in the fan flow, between the two opposed portions of the fan duct, results in a shift in the direction of the net thrust produced by the fan from a direction parallel to the center longitudinal axis of the engine. Since optimal (minimal) fuel consumption of a gas turbine engine is generally achieved by maintaining the direction of thrust produced by the engine in a direction parallel to the longitudinal centerline of the engine, the shift in the vector direction of the engine's net thrust output must necessarily compromise (increase) fuel consumption.

To accommodate this imbalance in fan flow through the fan duct caused by the obstruction offered by the pylon's presence in the fan duct, in accordance with the present invention, that portion of the fan duct through which the pylon extends, on one side of a central plane of the engine, is made larger than that portion of the fan duct on the opposite side of the central plane to make up for the restriction to fan air flow caused by the pylon. In a preferred embodiment, the difference in area between the two fan duct cross sectional areas at a downstream portion thereof (i.e., at the fan exhaust nozzle) is equal to the cross sectional area of the pylon presented to the flow through the fan duct. This difference in area essentially eliminates the shift in the direction of the net thrust produced by the engine for optimal (minimal) fuel consumption in the face of the restriction caused by the pylon.

The increase in fan exhaust nozzle area in that portion of the fan duct through which the pylon extends may be achieved in several ways. For example, the center longitudinal axis of the fan cowl may be offset toward the pylon from the longitudinal center axis of the engine at a downstream portion of the cowl. Alternatively, the longitudinal centerline of the engine's core cowl may be displaced away from the pylon, with respect to the engine's centerline, or, where clearances permit, and where the pylon presents a large obstruction to the flow area through the fan duct, the fan cowl may be shifted toward the pylon and the core cowl away therefrom.

It is estimated that the asymmetric distribution of the fan duct flow area at the fan exhaust nozzle thereof will result in up to an approximate improvement of up to 0.5% in total specific fuel consumption which, when taken in the context of modern commercial aircraft consumption of hundreds of thousands of gallons of fuel on an annual basis, represents a significant improvement in the operational costs associated with such engine.

DETAILED DESCRIPTION OF THE INVENTION

Figure 1:
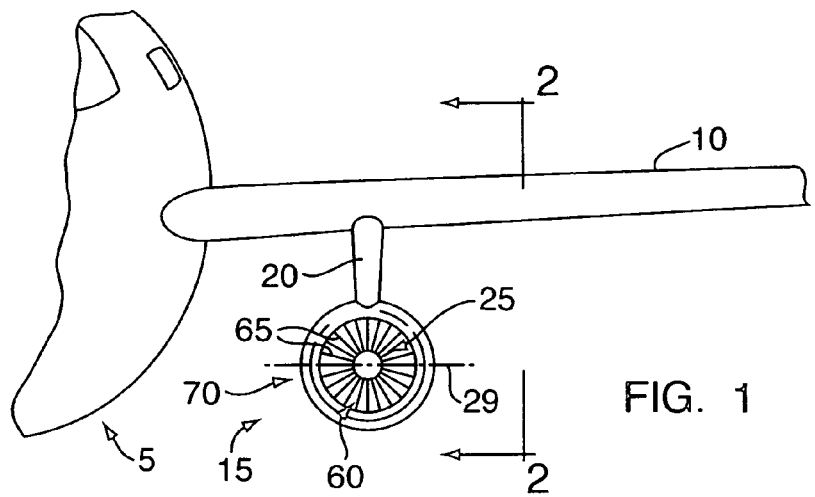
FIG. 1 is a partial front elevation of a commercial transport aircraft powered by a gas turbine engine of the type employing the fan exhaust nozzle of the present invention.
Figure 2:
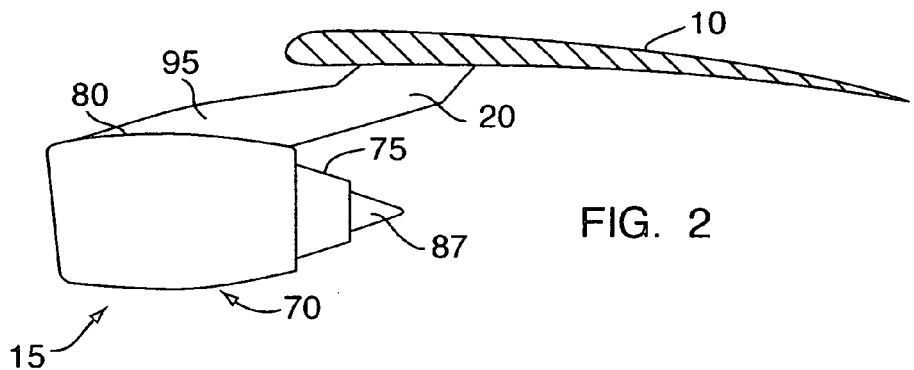
FIG. 2 is a sectional side elevation taken in the direction of line 2-2 of FIG. 1.
Figure 4:
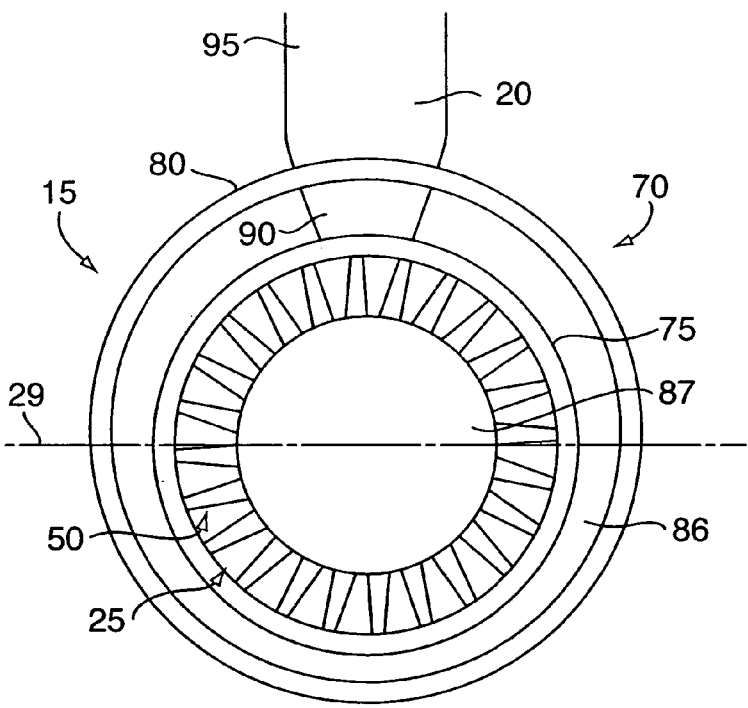
FIG. 4 is a rear elevation of the gas turbine engine power plant shown in FIG. 3.
Figure 3:
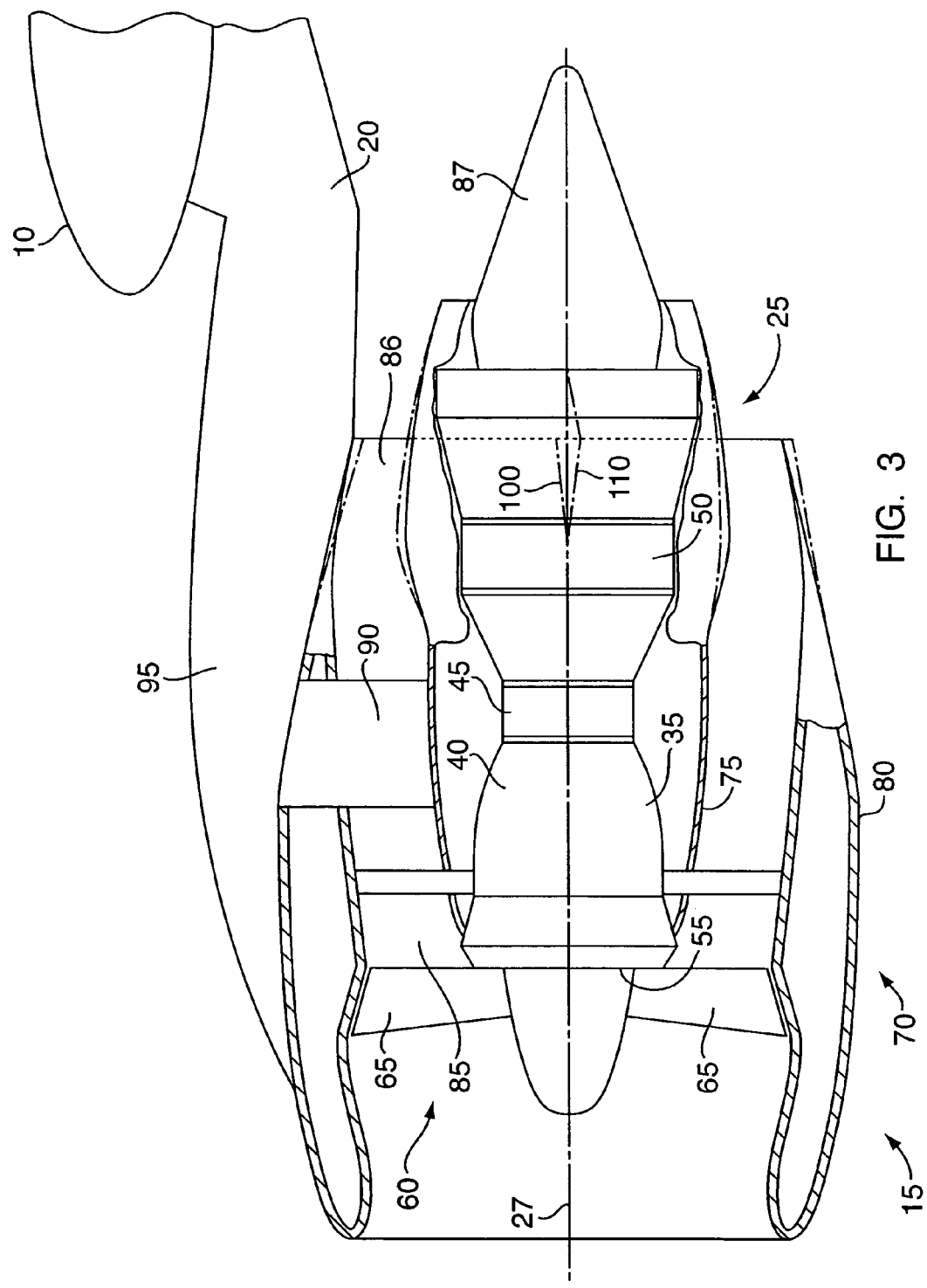
FIG. 3 is an enlarged view of the power plant of FIG. 2 with portions of the nacelle thereof sectioned and broken away to show details of the present invention.

Referring to FIGS. 1 and 2, a commercial gas turbine engine powered aircraft includes a wing 10 having one or more gas turbine engine power plants 15 mounted on the underside thereof by a pylon 20. As best seen in FIG. 3, gas turbine engine power plant 15 comprises a gas turbine engine 25 characterized by a longitudinal central axis 27 which lies in a horizontal (under normal operating conditions) central plane 29 of the engine. In a manner well known in the art, gas turbine engine 25 includes a case 35 enclosing a compressor 40 (not shown), a combustor 45 (not shown), and a turbine 50 (also not shown), the details of which are well known in the art. As is also well known in the art, air entering compressor 40 through inlet 55 is compressed in the compressor, and enters the combustor where it is mixed with jet fuel and burned, the products of combustion (working fluid) flowing into turbine 50 which extracts energy therefrom to drive the compressor and provide thrust for powering the aircraft. The turbine also drives a fan 60 comprising blades 65 of fixed or adjustable pitch. As blades 65 rotate, they take in ambient air, and accelerate the air to provide the majority of the useful thrust produced by the engine. Typically, due to the much larger diameter of the fan compared to that of the core engine, in modern turbofan engines, the volumetric flow through the fan can be as high as 5-10 times the volumetric flow through the core engine or in some cases, even higher.

For purposes of maintaining a controlled flow of air, both around the outside of the power plant and through the core engine, the engine and fan are surrounded by a nacelle 70 comprising a core engine cowl 75 which surrounds the core engine and a fan cowl 80 disposed around the exterior of the core cowl and defining therewith, a generally annual fan duct 85 which accommodates the flow of ambient air accelerated by fan 65, terminating at fan exhaust nozzle 86 at the downstream end of the fan duct. A tail cone 87 may be provided at the turbine exhaust nozzle to smooth the flow of working fluid exhausted from the turbine.

In a manner well known in the art, the engine 25 and nacelle 70 are fixed to the wing 10 of aircraft 5 by pylon 20. Pylon 20 is fixed to a wing spar or other suitable structural component of the aircraft (not shown) at one end thereof, and, at the other end thereof, to the engine and nacelle. The pylon comprises a structural beam 90 which provides support for the engine and nacelle, transmitting the weight and operational (aerodynamic) loads thereof to the wing of the aircraft, and a faring 95 which provides a smooth aerodynamic contour to the pylon, reducing the aerodynamic losses associated with fan airflow therearound as the power plant moves through the air with the aircraft.

It will be readily apparent that a significant amount of fan airflow through fan duct 85 will be blocked at an upper portion of the fan duct by pylon 95. It has long been recognized that the blockage of fan air in the upper portion of the fan duct by the pylon contributes a significant amount of drag as the engine and pylon move through the ambient air. However, in accordance with the present invention, it has been determined that the flow restriction imposed on fan airflow through the fan duct in prior art gas turbine engine power plants also results in a higher volumetric flow rate of air through the lower (away from the pylon) portion of the fan duct than the upper portion thereof. That is, the flow blockage in the fan duct associated with the pylon, causes a net migration of fan airflow from the upper portion of the fan duct, to the lower portion thereof. As set forth hereinabove, for maximum efficiency, the thrust produced both by the fan and the core engine should be directed parallel to the centerline of the engine. It has been determined that the greater flow through the lower portion of the fan duct skews the direction of the net thrust produced by the engine from an axial direction, thereby lowering the engine's efficiency so that the fuel consumption of the engine is increased from that which could be by a uniform fan airflow around the entire fan duct.

In accordance with the present invention, to compensate for the flow restriction of the pylon in the upper portion of the fan duct, the cross sectional flow area of the fan exhaust nozzle at an upper portion (toward the pylon) thereof, i.e., that portion above the horizontal mid-plane of the engine is increased over the area of the fan exhaust nozzle below the engine (away from the pylon) mid-plane. This increase in the upper portion of the fan exhaust nozzle reduces the tendency of the fan flow to migrate toward the lower portion of the nozzle in response to the blockage associated with the pylon thereby correcting what otherwise would result in a vertical skewing of the net thrust produced by the engine.

The area of the upper portion of the fan exhaust nozzle may be increased in several different ways. For example, the downstream portion of the fan cowl may be vertically offset upwardly (toward the pylon) from a position concentric with the core engine. That is, the downstream portion of the longitudinal centerline of the fan cowl may be offset vertically upwardly (toward the pylon) from the centerline of the core engine at shown at 100 in FIG. 3. The increased flow area at the upper portion of the fan exhaust nozzle may also be achieved by offsetting core cowl 75 downwardly (away from the pylon) such that the longitudinal axis 110 thereof is offset downwardly from the longitudinal centerline of the engine. Where a tail cone is used in the present invention, the extreme downstream-end of the core cowl should be made symmetric with the core engine and tail cone so as not to vertically skew the direction of the thrust produced by the core engine.

The difference in cross-sectional areas between the two portions of the fan exhaust nozzle and thus, the amount of vertical displacement of the fan cowl and core cowl to achieve the increased area in the upper portion of the fan duct will, of course, depend upon the engine's thrust rating and by-pass ratio, dimensions of the pylon and dimensions and operational parameters of the core engine and fan. In general, the larger the engine, the larger the area of the pylon which partially blocks fan flow through the upper portion of the fan duct, thereby requiring a larger increase in fan duct area over that which would be required with smaller engines. While in the preferred embodiment, the increased flow area in the upper portion of the fan duct is achieved by offsetting the fan duct toward the pylon from the center line of the core engine and offsetting the core cowl away from the pylon with respect to the engine's centerline, it will be appreciated that depending upon the relative configuration of the engine nacelle and pylon, it may be possible to achieve the necessary increase in fan exhaust nozzle area by offsetting only one of these components from the centerline of the engine.

While the fan duct and core cowl have been shown to be generally circular in cross section as is normally the case for equalization of aerodynamic loading therearound, it will be appreciated that for other considerations, cross sectional shapes of these components may vary from circular. It will also be understood that although the pylon supports the engine from a location below the wing of the aircraft in the illustrative (preferred) embodiment, the present invention may be employed with other configurations of power plants relative to the aircraft. For example, the invention herein may be used in aircraft in which the power plants are mounted above the aircraft's wings or on the sides of the fuselage.

Accordingly, while the invention herein as been described in reference to a specific preferred embodiment, it will be understood that those variations thereof set forth herein as well as other variations and modifications may suggest themselves to persons skilled in the art, and it is intended by the following claims to cover any such variations or modifications as fall within the true spirit and scope of this invention.

Having thus described the invention, what is claimed is:

1. In a gas turbine engine power plant comprising;
a pylon,
a fan,
a nacelle supported by said pylon and in register with said fan,
a core gas turbine engine disposed within said nacelle and having a first longitudinal centerline associated therewith, said core gas turbine engine driving said fan that discharges airflow therefrom during operation of said core gas turbine engine,
a core cowl disposed interiorly of said nacelle and supported by said pylon, said core cowl surrounding said core gas turbine engine and supported by a portion of said pylon extending between said nacelle and said core cowl, said portion of said pylon partially restricting a flow area between said nacelle and said core cowl,
said flow area having a first portion thereof disposed on one side of a central plane of said engine and an opposite portion disposed on the opposite side of said central plane of said core gas turbine engine,
wherein said nacelle is vertically shifted and offset upwardly about said flow area toward the pylon from said longitudinal centerline or wherein said core cowl within said flow area is vertically shifted and offset downwardly from a longitudinal centerline of said nacelle, and
wherein said first portion of said flow area has a greater cross-sectional flow dimension than said opposite portion thereof in an amount to compensate for the pylon.

2. The gas turbine engine power plant of claim 1 wherein the central plane is oriented horizontally when at rest.

3. The gas turbine engine power plant of claim 1 wherein said nacelle is vertically shifted and offset upwardly about said flow area toward the pylon from said longitudinal centerline and said core cowl within said flow area is vertically shifted and offset downwardly from said longitudinal center line of said nacelle.

4. A nacelle adapted for receiving therewithin, a gas turbine engine, said nacelle comprising:
a fan duct; and
a core engine cowl disposed within said fan duct, wherein said fan duct and said core engine cowl define a fan nozzle therebetween, said engine cowl having a longitudinal center line;
a pylon extending though said fan duct and contacting said core engine cowl,
said fan nozzle having a first portion disposed on a central plane of said gas turbine engine and a second portion disposed on an opposite side of said central plane of said gas turbine engine, said first portion of said fan nozzle through which said pylon extends having a larger flow area than said second portion of said fan nozzle in an amount to compensate for the pylon;
wherein said fan nozzle, downstream of said pylon, is vertically shifted and offset upwardly from said longitudinal centerline or wherein said core cowl within said fan nozzle, downstream of said pylon, is vertically shifted and offset downwardly from a longitudinal center line of said fan nozzle.

5. The nacelle of claim 4 wherein said central plane is oriented horizontally when at rest.

6. The nacelle of claim 4 wherein said fan nozzle, downstream of said pylon, is vertically shifted and offset upwardly from said longitudinal centerline and wherein said core cowl within said fan nozzle, downstream of said pylon, is vertically shifted and offset downwardly from said longitudinal center line of said fan nozzle.

7. The nacelle of claim 4 wherein said fan duct at a downstream end thereof is generally circular in cross section.

8. The nacelle of claim 4 wherein said core cowl at a downstream end thereof is generally circular in cross section.

* * * * *